United States Patent
Wang et al.

(10) Patent No.: US 8,244,382 B2
(45) Date of Patent: Aug. 14, 2012

(54) APPARATUS FOR MONITORING A SCHEDULE FOR TESTING A FUEL CELL

(75) Inventors: Hung-Yu Wang, Taoyuan County (TW); Wen-Tang Hong, Taoyuan County (TW); Yu-Ching Tsai, Taoyuan County (TW); Tzu-Hsiang Yen, Taoyuan County (TW); Wei-Ping Huang, Taoyuan County (TW); Cheng-Nan Huang, Taoyuan County (TW)

(73) Assignee: Atomic Energy Council—Institute of Nuclear Research, Taoyuan County (TW)

( * ) Notice: Subject to any disclaimer, the term of this patent is extended or adjusted under 35 U.S.C. 154(b) by 466 days.

(21) Appl. No.: 12/685,282

(22) Filed: Jan. 11, 2010

(65) Prior Publication Data
US 2011/0172789 A1 Jul. 14, 2011

(51) Int. Cl.
*G05B 19/04* (2006.01)
*G05B 11/01* (2006.01)

(52) U.S. Cl. ............. 700/17; 700/14; 702/108; 702/188

(58) Field of Classification Search .............. 700/17–19, 700/21, 79, 83, 14; 702/108, 123, 188; 429/428, 429/430–432, 90; 73/432.1
See application file for complete search history.

(56) References Cited

U.S. PATENT DOCUMENTS

| | | | |
|---|---|---|---|
| 6,978,224 B2 * | 12/2005 | Gopal ............................ | 702/182 |
| 2004/0054483 A1 * | 3/2004 | Gopal et al. .................... | 702/63 |
| 2004/0268155 A1 * | 12/2004 | Andrews ....................... | 713/202 |

OTHER PUBLICATIONS

Paganin et al. "A test station facility for research and development on fuel cell components and materials" AIP Rev. Sci. Instrum. vol. 68, pp. 3540-3543, 1997.*

* cited by examiner

*Primary Examiner* — John R. Cottingham
*Assistant Examiner* — Steven Garland
(74) *Attorney, Agent, or Firm* — Jackson IPG PLLC

(57) ABSTRACT

An apparatus for monitoring a schedule for testing a fuel cell in a station. Because of the apparatus, the station can test a low-temperature fuel cell or a high-temperature fuel cell. The apparatus enables a user to test the fuel cell through the station manually or enables the station to test the fuel cell automatically.

16 Claims, 2 Drawing Sheets

APPARATUS FOR MONITORING A SCHEDULE FOR TESTING A FUEL CELL

FIELD OF THE INVENTION

The present invention relates to an apparatus for monitoring a schedule for testing a fuel cell and, more particularly, to an apparatus for monitoring a schedule for testing a low-temperature or high-temperature fuel cell manually or automatically.

DESCRIPTION OF THE RELATED ARTS

Fuel cells are getting much attention for being environmentally friendly and efficient regarding energy conversion. There are proton exchange membrane fuel cells ("PEMFC"), alkaline fuel cells ("AFC"), phosphoric acid fuel cells ("PAFC"), molten carbonate fuel cells ("MCFC") and solid oxide fuel cells ("SOFC"). PEMFC, AFC and PAFC are classified in a low-temperature type. MCFC are classified in a middle-temperature type. SOFC are classified in a high-temperature type. Moreover, there are direct methanol fuel cell ("DMFC") and metal-air hybrid cells. SOFC are getting more attention than other fuel cells for their high energy efficiencies and including circulation stations to use non-reacted fuels and high-temperature waste heat.

Regarding operative principles of an SOFC, a fuel and an oxidizer such as air and oxygen are preheated to a temperature near an operative temperature (600 to 1000 degrees Celsius) of stacks of the SOFC before they are introduced into the cathode and anode of the SOFC. Hydrogen is often used as the fuel. Alternatively, a carbohydrate may be used as the fuel. In this case, a reformer converts the carbohydrate into a hydrogen-rich gas for use in the SOFC. In fact, the carbohydrate can be used after it is desulphurized.

Unlike the fuel cells of the low-temperature type, SOFC require a high operative temperature of 600 to 1000 degrees Celsius. Moreover, an SOFC includes a membrane electrolyte assembly ("MEA"). At the cathode of the MEA, oxide ions are formed. Then, the oxide ions are transferred to the anode of the MEA through a solid-state electrolyte. At the anode of the MEA, the oxide ions react with hydrogen, carbon monoxide or a carbohydrate fuel. The products of the reaction are electrons, water and heat. Because the operative temperature of an SOFC is high, the temperature of the products near the anode and the temperature of the products near the cathode are close to the operative temperature. Therefore, the heat of the products near the anode and cathode can be recovered to heat gas before the gas is introduced into the anode of the SOFC.

In the operation of the low-temperature type of fuel cells or the high-temperature type of fuel cells, only a portion of the fuel therein is used. About 60% to 85% of the fuel is used. That is, about 40% to 15% of the fuel is not consumed during the reaction. A burner is often used to combust the residual fuel to release heat that can be recovered with a heat exchanger and used for preheating the station.

Compared with the low-temperature type of fuel cells, SOFC are flexible in selecting the fuel, efficient and flexible in selecting a combined heat and power generation station. Therefore, SOFC are getting more and more attention. During development of SOFC, tests on the stacks are necessary. Generally, a test station tests the stacks. An example of a test station for the low-temperature type of fuel cells can be found in Taiwanese Patent M572462. The exemplary test station includes a gas supply unit, a stack load control unit, a station control unit and a human-machine interface. However, other test stations for the low-temperature type of fuel cells were seen before the filing of the Taiwanese patent. However, these test stations cannot be used for the high-temperature type of fuel cells. To test the high-temperature type of fuel cells, a station must include a temperature control unit and a security unit for example in addition to a gas supply unit, a stack load control unit, a station control unit and a human-machine interface.

The present invention is therefore intended to obviate or at least alleviate the problems encountered in prior art.

SUMMARY OF THE INVENTION

It is an objective of the present invention to provide an apparatus for monitoring a schedule for testing a low-temperature or high-temperature fuel cell in a station automatically or manually.

It is another objective of the present invention to provide an apparatus for monitoring a schedule for testing a fuel cell in a station so that the schedule can be edited beforehand or amended during the execution thereof.

To achieve the foregoing objectives, the station includes a human-machine interface assembly and a central controller assembly. The human-machine interface assembly includes a data operator. The central controller assembly includes a programmable logic controller. The apparatus includes a human-machine interface, a schedule editor, a current-voltage curve editor, a data storage unit, a schedule executor and an instrument driver. The human-machine interface is disposed in the human-machine interface assembly and electrically connected to the data operator. The schedule editor is disposed in the human-machine interface assembly and electrically connected to the data operator. The schedule editor is operable based on a commercial programming language to enable a user to edit and amend a schedule for operating the station and produce a schedule file via the human-machine interface. The current-voltage curve editor is disposed in the human-machine interface assembly and electrically connected to the data operator to enable the user to view and edit a current-voltage curve in an operative condition via the human-machine interface. The data storage unit is disposed in the human-machine interface assembly and electrically connected to the data operator for storing the schedule file, present values and set values for various sensors and instruments. The schedule executor is disposed in the central controller assembly, electrically connected to the programmable logic controller, made of real-time modules, and used to produce a control operation command based on the schedule file and cause the current-voltage curve editor to execute the Tafel test. The instrument driver is disposed in the central controller assembly and electrically connected to the programmable logic controller and the schedule executor to drive the instruments under the control operation command provided from the schedule executor. The schedule file includes a stop point, at least one target, at least one target-related parameter, an execution period, fluid control-related setting, temperature control-related setting, heat recovery-related setting, electric load-related setting, a stack temperature-controlling procedure, a reformer monitor procedure, a burner control procedure, a user-defined procedure, an emergency shut-down procedure and a normal shut-down procedure.

Other objectives, advantages and features of the present invention will become apparent from the following description referring to the attached drawings.

BRIEF DESCRIPTIONS OF THE DRAWINGS

The present invention will be described via the detailed illustration of the preferred embodiment referring to the drawings.

DESCRIPTION OF THE PREFERRED EMBODIMENT

Figure 2:
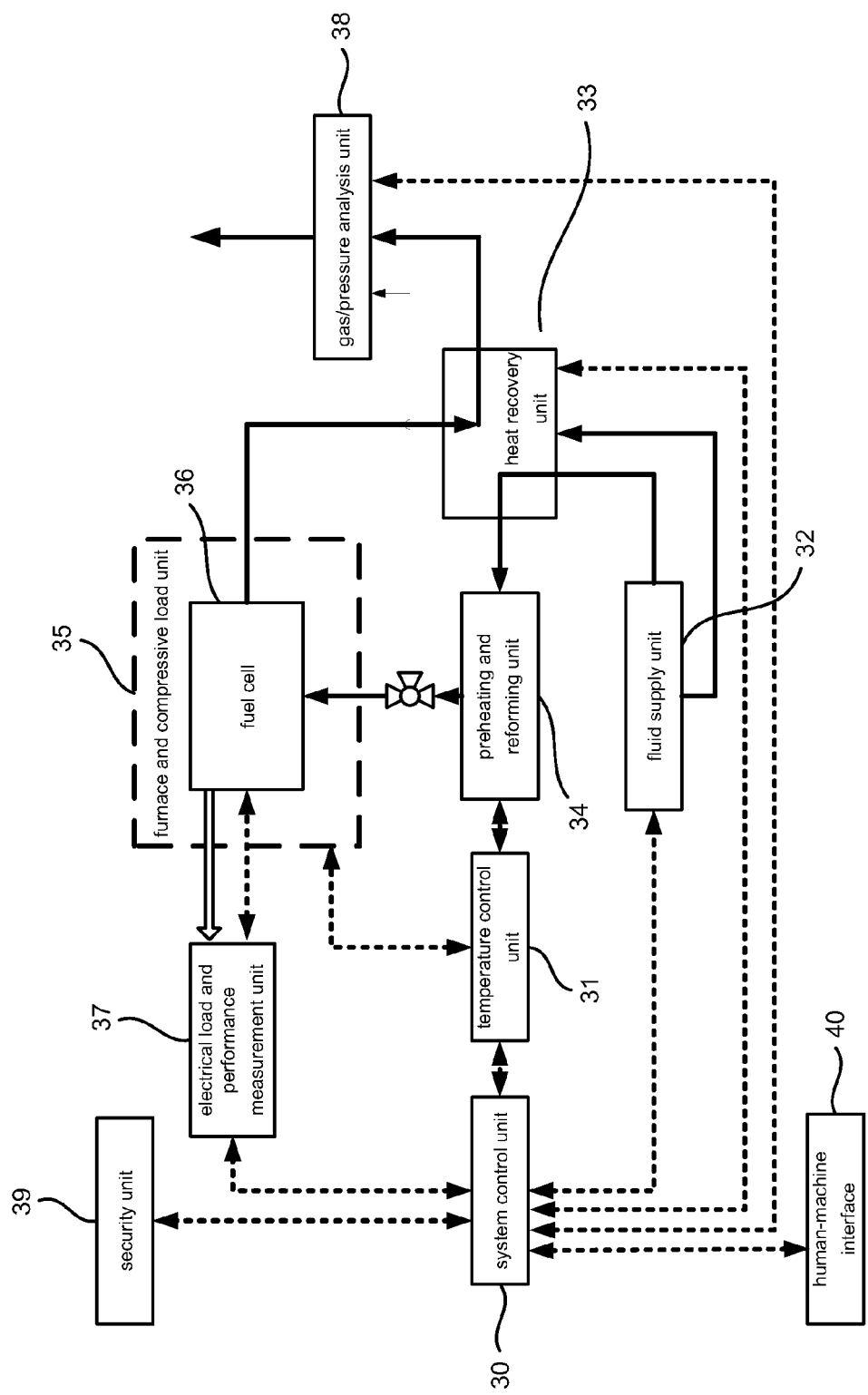
FIG. 2 is a block diagram of a station for testing a fuel cell in which the apparatus shown in FIG. 1 can be used.

Referring to FIG. 2, there is shown a station for testing a fuel cell 36 that may be a low-temperature or high-temperature fuel cell. The station includes a human-machine interface assembly (or "IPC") and a central controller assembly (or "CFP"). A data operator 20 is disposed in the IPC. The data operator 20 is preferably an industrial computer. A programmable logic controller 21 is disposed in the CFP.

In detail, the station includes a system control unit 30, a temperature control unit 31, a fluid supply unit 32, a heat recovery unit 33, a preheating and reforming unit 34, a furnace and compressive load unit 35, an electrical load and performance measurement unit 37, a gas/pressure analysis unit 38, a security unit 39 and a human-machine interface 40. The fuel cell 36 is disposed in the furnace and compressive load unit 35 for testing.

Figure 1:
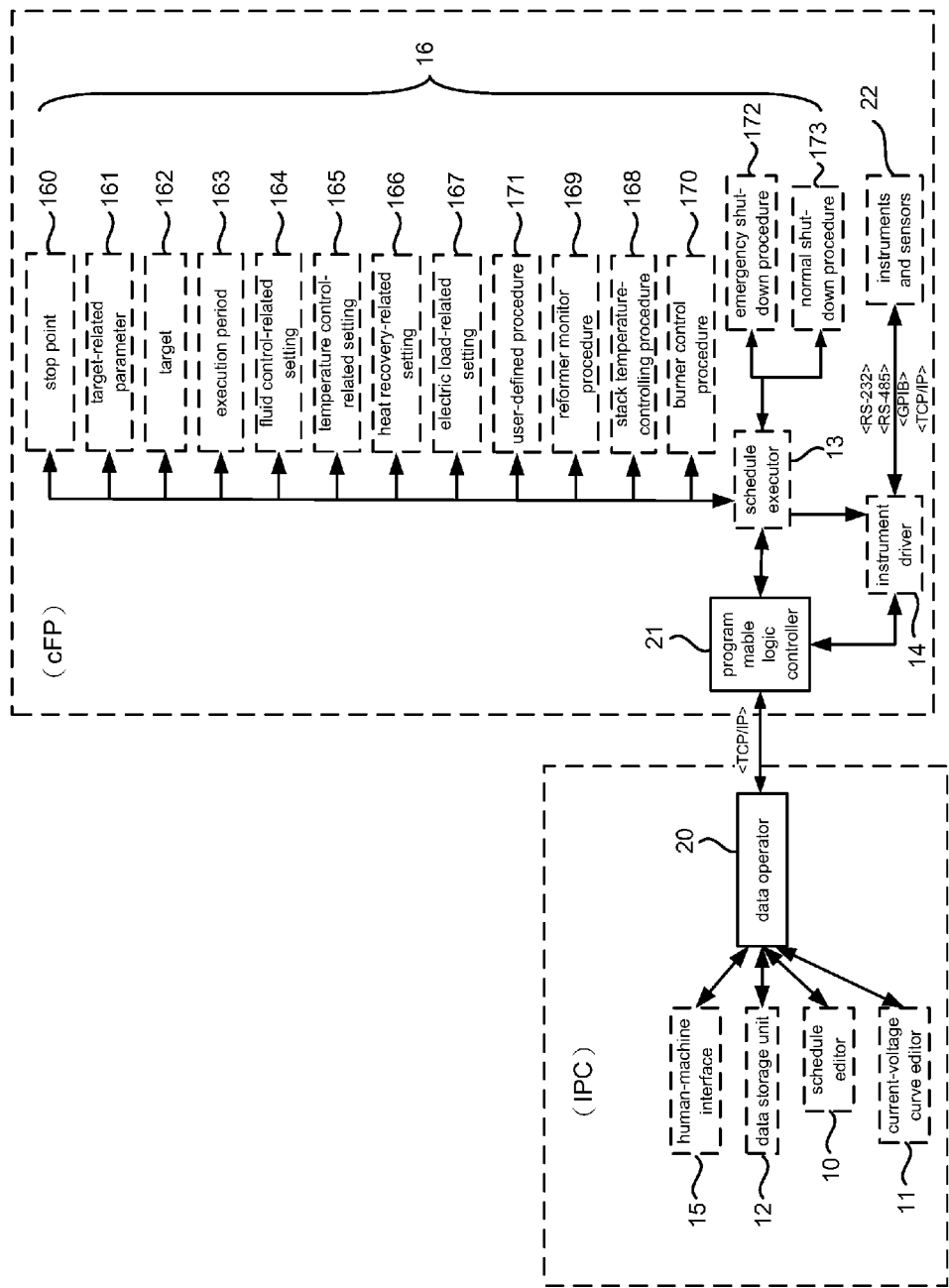
FIG. 1 is a block diagram of an apparatus for monitoring a schedule for testing a fuel cell according to the preferred embodiment of the present invention.

Referring to FIG. 1, there is shown an apparatus for monitoring a schedule for testing the fuel cell 36 within the station manually or automatically according to the preferred embodiment of the present invention. The apparatus is used to display and edit hardware parameters of the station via the IPC so that the CFP executes the schedule based on the parameters. The apparatus includes a schedule editor 10, a current-voltage curve editor 11 (the "I-V curve editor 11"), a data storage unit 12, a schedule executor 13, an instrument driver 14 and a human-machine interface 15. The schedule editor 10, the I-V curve editor 11, the data storage unit 12 and the human-machine interface 15 are disposed in the IPC. The schedule executor 13 and the instrument driver 14 are disposed in the CFP.

The schedule editor 10 is connected to the data operator 20 electrically. The schedule editor 10 is operated based on a commercial programming language. The schedule editor 10 enables a user to edit and amend a schedule for operating the station and produce a schedule file 16 with help from the data operator 20. The human-machine interface 15 enables the user to monitor all data and send commands to all controllers. The human-machine interface 15 enjoys the top priority.

The I-V curve editor 11 is connected to the data operator 20 electrically. The I-V curve editor 11 is used to execute the TAFEL test to determine an I-V curve with help from the human-machine interface 15, which is connected to the data operator 20.

The data storage unit 12 is connected to the data operator 20 electrically. The data storage unit 12 is used to store the schedule file 16 and present values ("PV") or set values ("SV") of sensors or instruments.

The schedule executor 13 is connected to a programmable logic controller 21 electrically. The schedule executor 13 is made of real-time modules and used to produce a control operation command based on the schedule file 16.

The instrument driver 14 is connected to the schedule executor 13 electrically. In compliance with the control operation command provided from the schedule executor 13, the instrument driver 14 drives every instrument.

Together with the human-machine interface 15, the schedule editor 10 lets the user know how to edit the schedule file 16 by instinct. The schedule file 16 is stored in an ASCII format in the data storage unit 21. The schedule file 16 can later be called and used. The schedule file 16 includes a stop point 160, at least one target-related parameter 161, at least one target 162, an execution period 163, fluid control-related setting 164, temperature control-related setting 165, heat recovery-related setting 166, electric load-related setting 167, a stack temperature-controlling procedure 168, a reformer monitor procedure 169, a burner control procedure 170, a user-defined procedure 171, an emergency shut-down procedure 172 and a normal shut-down procedure 173.

The schedule editor 10 provides functions such as NEW, OPEN, ADD, INSERT, EDIT, DELETE and SAVE. NEW enables the user to initiate a new schedule file. OPEN enables the user to open an existing schedule file so that it can be viewed or edited. ADD enables the user to add a line to the bottom of a schedule. INSERT enables the user to insert a line between any two adjacent lines of a schedule. EDIT enables the user to edit a chosen line of a schedule file. DELTE enables the user to delete a chosen line of a schedule file. SAVE enables the user to save a schedule file. A function COPY can be used together with ADD or INSERT to add or insert a line that is identical to an existing line to reduce the load on the user.

While the schedule editor 10 is sending the schedule file 16 to the programmable logic controller 21 according to TCP/IP, the schedule executor 13 is executing the schedule file 16. Before executing the stop point 160, the target-related parameter 161, the target 162 and the execution period 163, the schedule executor 13 determines whether a current procedure is complete, and whether a next procedure is to be executed. The target-related parameter 161 may be a present valve of a sensor or instrument. In each procedure, at least one target-related parameter 161 is selected for at least one sensor or instrument. The relation between the parameters may be [AND] or [OR]. Based on the selected target-related parameter 161, the target 162 is set.

Once initiated, a procedure will not be stopped until the execution period 163 is reached or a predetermined relation is built between the PV of the target-related parameter 161 and the target 162. The relation may be LARGER THAN, EQUAL TO or SMALLER THAN. If the relation between the stop point 160 and the execution period is [AND], the procedure will not be stopped until both of the criteria are met. If the stop point is selected to be NONE, the execution period 163 will be the only criterion.

In an embodiment, the stop point 160 is a criterion for determining whether the procedure is complete. The stop point 160 is defined by whether the predetermined relation is built between the PV of a sensor defined by the target-related parameter 161 and the target 162. The execution period 163 represents the total time required for the execution of a line of command in the schedule file 16.

While executing the fluid control-related setting 164, the schedule executor 13 sets flow rates of various fluids under the control of mass flow controllers at the cathode and anode of the fuel cell 36 during each procedure. Where a flow rate is not zero, a corresponding solenoid valve ("SV") is turned on.

While executing the temperature control-related setting 165, the schedule executor 13 sets temperatures and heating rates required for air, fuel and the temperature controller 31.

While executing the heat recovery-related setting 166, the schedule executor 13 uses a proportional valve to adjust a flow rate into a heat exchanger corresponding to heat required for the heat recovery unit 33.

While executing the electric load-related setting 167, the schedule executor 13 enables selection of parameters of an electrical load machine during electric testing and measures properties of the fuel cell 36 under various electrical loads.

Where a constant current or voltage is elected, setting related thereto will be presented. If the Tafel mode is selected, the Tafel test is run automatically. The Tafel test procedure is the ASCII format. Its file is previously disposed in the programmable logic controller 21 through the I-V curve editor 11. The Tafel test procedure can be executed in a constant-voltage ("CV") or constant-current ("CC") mode.

In the CV mode, an initial voltage, a final voltage, step values and a period between any two adjacent steps can be set for discharge. If a relation is built between a selected parameter and a target, the discharge will be stopped, and a reverse procedure will be executed to return to an open circuit voltage ("OCV") based on current situations.

In the CC mode, an initial voltage, a final voltage, step values and a period between any two adjacent steps can be set for the discharge. If a relation is built between a selected parameter and a target, the discharge will be stopped, and a reverse procedure will be executed to return to an open circuit voltage ("OCV") based on current situations.

Parameters for selection include the voltage of each fuel cell, the maximum, minimum and average values of all fuel cells. The relation between the selected parameter and the target is larger than, equal to or smaller than.

The schedule executer 13 executes the stack temperature-controlling procedure 168 because a stack is operable only in a range of temperature. While executing the stack temperature-controlling procedure 168, the schedule executer 13 monitors the temperature of the stack, and takes protective actions if necessary. If the temperature of the stack is too low, the schedule executer 13 turns on an air-preheating device for example. If the temperature of the stack is too high, the schedule executer 13 increases the flow rate of air.

While executing the reformer control procedure 169, the schedule executer 13 controls the preheating and reforming unit 34. Thus, the latter is stably operable to heat and mix natural gas or a carbohydrate fuel, air and water and cause them to react with help from a catalyst. Hence, they are reformed into hydrogen-rich gas.

A burner is used to burn residual fuel released from the fuel cell 36 to increase the thermal efficiency of the entire system. The schedule executer 13 executes the burner control procedure 170 to guarantee normal operation of the burner. The schedule executer 13 prevents fire from die-out or provides temper. The schedule executer 13 can take actions such as adjusting the flow rates of the natural gas and air.

The user-defined procedure 171 is executed to protect each element during the testing. While executing the user-defined procedure 171, the schedule executer 13 takes a protective action such as initiating and stopping a subroutine.

If the operation of the system is complete normally, the schedule executer 13 executes the normal shut-down procedure 173. If the operation of the system is abnormal and the abnormal operation cannot be overcome with any protective action, the schedule executer 13 executes the emergency shut-down procedure 172. In case where electricity from the mains is interrupted, an uninterruptible power system is used to enable the schedule executer 13 to completely execute the emergency shut-down procedure 172.

After receiving the schedule file 16 from the schedule editor 10, the schedule executer 13 produces and transfers commands to the instrument driver 14. Through the human-machine interface 15, the commands are given to the industrial computer 20. Then, the commands are transferred from the human-machine interface assembly into the central controller assembly. The programmable logic controller 21 of the central controller assembly is used to transfer the commands to the instruments and sensors 22 in accordance with a digital communication protocol such as RS-323, RS-485, RS-422 and GPIB or an internet communication protocol such as TCP/IP. The scanning rate of the central controller assembly and the instruments connected thereto is once every few seconds. The central controller assembly is communication with the human-machine interface assembly according to TCP/IP. The transmission to every instrument is once every few seconds.

When the system is operated according the commands, all of the data (including the PV and SV) are saved in the data storage unit 12 as a file. The storage of the data can be done in two manners, i.e., according to the volume of the data and a time interval. The format of the file can be *.txt or *.csv. Where the Tafel test is run, the system automatically saves, in another file, data including the current, voltage and power.

The user can interrupt the execution of the schedule by giving ABORT or PAUSE through the human-machine interface 15. When PAUSE is executed, the execution of the schedule pauses in the current procedure, and all of the units remain in their current statuses. When PAUSE is released, the execution of the current procedure begins again. When ABORT is executed, the execution of the schedule is stopped, and the system is returned to the human-machine interface assembly. No matter PAUSE or ABORT is executed, the central controller assembly transfer all of the PV to the human-machine interface assembly.

As discussed above, the apparatus of the present invention is operable in the automatic or manual mode. In the automatic mode, a user edits the schedule beforehand, and the apparatus causes the station to test the fuel cell 36 according to the schedule automatically. A user can edit immediately and simply without having to possess fundamentals and techniques of programming. The user can amend the schedule so that both low-temperature and high-temperature fuel cells can be tested.

In operation, the PLC (or the controller including the microcontroller) of the station control unit 30 is used as a control center to run a schedule. At first, the signal acquisition device acquires signals from the units and sensors, and sends the signals to the PLC. Then, the PLC relays the data to the industrial computer for processing and storage of the data. The signals are transferred to the PLC and the industrial computer from the sensors and the units through the signal-and-power line. After the processing of the data in the industrial computer is complete, results are provided in numbers, charts and tables through the human-machine interface 40. At this instant, a user can give commands to control the units through the human-machine interface 40. The flow of the commands is opposite to that of the signals. The station control unit 30 communicates analog signals with the temperature sensor and the pressure/differential sensor, but communicates digital signals with the other units and sensors. The signals may be communicated according to a digital communication protocol such as RS-323, RS-485, RS-422 and GPIB or an internet communication protocol such as TCP/IP.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. An apparatus for monitoring a schedule for testing fuel cells in a station that comprises a human-machine interface assembly and a central controller assembly, wherein the human-machine interface assembly comprises a data operator, the central controller assembly comprises a programmable logic controller, and the apparatus comprises:

a human-machine interface disposed in the human-machine interface assembly and electrically connected to the data operator;

a schedule editor disposed in the human-machine interface assembly and electrically connected to the data operator, wherein the schedule editor includes programming language enabling a user to edit and amend a schedule for operating the station and further producing a schedule file via the human-machine interface;

a current-voltage curve editor disposed in the human-machine interface assembly and electrically connected to the data operator to enable a user to view and edit a current-voltage curve in an operative condition via the human-machine interface;

a data storage unit disposed in the human-machine interface assembly and electrically connected to the data operator for storing the schedule file, present values and set values of sensors and instruments;

a schedule executor disposed in the central controller assembly, electrically connected to the programmable logic controller, made of real-time modules, and producing a control operation command based on the schedule file and causing the current-voltage curve editor to execute a Tafel test; and an instrument driver disposed in the central controller assembly and electrically connected to the programmable logic controller and the schedule executor to drive the instruments under the control operation command provided from the schedule executor;

the schedule file comprises a stop point, at least one target, at least one target-related parameter, an execution period, fluid control-related setting, temperature control-related setting, heat recovery-related setting, electric load-related setting, a stack temperature-controlling procedure, a reformer monitor procedure, a burner control procedure, a user-defined procedure, an emergency shut-down procedure and a normal shut-down procedure.

2. The apparatus according to claim 1, wherein the schedule file is stored in the data storage unit according as an ASCII file and transferred to the central controller assembly using TCP/IP protocol.

3. The apparatus according to claim 1, wherein:

the controller responsive to the schedule file performing the following functions:

the stop point is used to determine whether a current procedure is complete, and whether a next procedure is to be executed;

the target-related parameter is compared with the target to determine that the current procedure is done responsive to a predetermined relation existing between them;

the execution period is used to indicate the length of time after initiation of the current procedure;

the fluid control-related setting is used to set at least one flow rate of fluid, and responsive to a non zero fluid control related setting actuates a solenoid valve the temperature control-related setting is used to set a temperature and a heating rate of temperature controllers in the current procedure;

the heat recovery-related setting is used to control a proportional valve to control at least one flow rate of fluid into a heat exchanger to control the quantity of recovered heat;

the electric load-related setting is used to adjust an electrical load and measure performance of a fuel cell at different values of the electrical load;

the stack temperature-controlling procedure is used to take actions to keep the temperature of a fuel cell in a predetermined range;

the reformer monitor procedure is used to control a reformer and a heater so that they operate normally and stably to reform a carbohydrate fuel into hydrogen-rich gas;

the burner control procedure is used to control a burner to prevent the burner from die-out and provide temper;

the user-defined procedure is used to take protective actions under control of the user;

the normal shut-down procedure is executed responsive to completely normal operation of the system; and the emergency shut-down procedure is executed responsive to abnormal operation of the system and the abnormal operation cannot be overcome with any protective actions, wherein an uninterruptible power system enables the schedule executer to complete the emergency shut-down procedure.

4. The apparatus according to claim 3, wherein the target-related parameter is a present value of one of the sensors and instruments.

5. The apparatus according to claim 3, wherein the target-related parameter is entered by the user.

6. The apparatus according to claim 3, wherein a procedure is stopped responsive to both the stop point and the execution period is AND.

7. The apparatus according to claim 3, wherein the electrical load-related setting comprises a constant-current mode, a constant-voltage mode and a Tafel mode.

8. The apparatus according to claim 7, wherein a Tafel mode comprises a constant-current mode and a constant-voltage mode.

9. The apparatus according to claim 8, wherein in the constant-voltage mode, an initial voltage, a final voltage, step values and a period between any two adjacent steps are set for discharge, and a reverse procedure will be executed to turn to an open circuit voltage based on current situations in response to a relation existing between a selected parameter and a target, the discharge will be stopped.

10. The apparatus according to claim 9, wherein the relation is selected from a group consisting of LARGER THAN, EQUAL TO and SMALLER THAN.

11. The apparatus according to claim 8, wherein in the constant-current mode, an initial voltage, a final voltage, step values and a period between any two adjacent steps are set for discharge, and the discharge will be stopped, and a reverse procedure will be executed to turn to an open circuit voltage based on current situations in response to a relation existing between a selected parameter and a target.

12. The apparatus according to claim 11, wherein the relation is selected from a group consisting of LARGER THAN, EQUAL TO and SMALLER THAN.

13. The apparatus according to claim 1, wherein communication of signals between the central controller assembly, the instruments and the sensors is done according to a protocol selected from a group consisting of RS-232, RS-485, GPIB and TCP/IP.

14. The apparatus according to claim 1, wherein the schedule editor provides NEW, OPEN, ADD, INSERT, EDIT, DELETE and SAVE function.

15. The apparatus according to claim 1, wherein the data operator is an industrial computer.

16. The apparatus according to claim 1, wherein the station is selected from a group consisting of a station for testing low-temperature fuel cells and a station for testing high-temperature fuel cells.

* * * * *